United States Patent
Konolige et al.

(10) Patent No.: US 10,455,212 B1
(45) Date of Patent: *Oct. 22, 2019

(54) PROJECTED PATTERN MOTION/VIBRATION FOR DEPTH SENSING

(71) Applicant: X Development LLC, Mountain View, CA (US)

(72) Inventors: Kurt Konolige, Mountain View, CA (US); Ethan Rublee, Mountain View, CA (US)

(73) Assignee: X Development LLC, Mountain Vew, CA (US)

( * ) Notice: Subject to any disclaimer, the term of this patent is extended or adjusted under 35 U.S.C. 154(b) by 521 days.

This patent is subject to a terminal disclaimer.

(21) Appl. No.: 14/583,903

(22) Filed: Dec. 29, 2014

Related U.S. Application Data

(60) Provisional application No. 62/041,289, filed on Aug. 25, 2014.

(51) Int. Cl.
| | | |
|---|---|---|
| *H04N 13/00* | (2018.01) | |
| *G06T 7/00* | (2017.01) | |
| *B25J 9/00* | (2006.01) | |
| *G01B 11/25* | (2006.01) | |
| *H04N 13/122* | (2018.01) | |
| *H04N 13/167* | (2018.01) | |
| *H04N 13/282* | (2018.01) | |

(52) U.S. Cl.
CPC ......... *H04N 13/122* (2018.05); *H04N 13/167* (2018.05); *H04N 13/282* (2018.05)

(58) Field of Classification Search
CPC ........... H04N 13/0018; H04N 13/0051; H04N 13/0282; H04N 13/0239

USPC .......................................................... 348/47
See application file for complete search history.

(56) References Cited

U.S. PATENT DOCUMENTS

| | | | | |
|---|---|---|---|---|
| 4,907,169 A | * | 3/1990 | Lovoi | B23K 26/04 |
| | | | | 219/124.34 |
| 6,167,151 A | * | 12/2000 | Albeck | G06K 9/00201 |
| | | | | 345/419 |
| 6,233,086 B1 | * | 5/2001 | Hardiman | A63J 17/00 |
| | | | | 359/225.1 |
| 6,754,370 B1 | * | 6/2004 | Hall-Holt | G01B 11/25 |
| | | | | 356/3 |

(Continued)

OTHER PUBLICATIONS

Schuon et al., LidarBoost: Depth superresolution for ToF 3D shape scanning, IEEE Conference on Computer Vision and Pattern Recognition 2009, Miami, FL, Jun. 20-25, 2009.

*Primary Examiner* — Susan E. Hodges
(74) *Attorney, Agent, or Firm* — McDonnell Boehnen Hulbert & Berghoff LLP

(57) ABSTRACT

Example implementations relate to determining depth information using stereo sensor data. An example system may include at least one projector coupled to a robotic manipulator and configured to project a texture pattern onto an environment. The system may further include a displacer coupled to the at least one texture projector and configured to repeatedly change a position of the texture pattern within the environment. The system may also include at least two optical sensors configured to capture stereo sensor data for the environment. And the system may include a computing device configured to determine, using the stereo sensor data, an output including a virtual representation of the environment.

19 Claims, 15 Drawing Sheets

(56) References Cited

U.S. PATENT DOCUMENTS

| | | | |
|---|---|---|---|
| 8,390,821 B2 * | 3/2013 | Shpunt | G01B 11/25 356/512 |
| 8,760,499 B2 | 6/2014 | Russell | |
| 9,233,470 B1 * | 1/2016 | Bradski | B25J 9/163 |
| 9,325,973 B1 * | 4/2016 | Hazeghi | G01B 11/2513 |
| 9,507,995 B2 * | 11/2016 | Konolige | G06K 9/00201 |
| 2005/0018209 A1 * | 1/2005 | Lemelin | G01B 11/25 356/604 |
| 2005/0128437 A1 * | 6/2005 | Pingali | H04N 9/3194 353/69 |
| 2006/0221072 A1 * | 10/2006 | Se | G01C 11/06 345/420 |
| 2013/0095920 A1 | 4/2013 | Patiejunas et al. | |
| 2013/0120547 A1 * | 5/2013 | Linnell | G06T 13/40 348/61 |
| 2013/0250042 A1 | 9/2013 | Raghoebardayal | |
| 2014/0002445 A1 | 1/2014 | Xiong et al. | |
| 2014/0081459 A1 | 3/2014 | Dubois et al. | |
| 2014/0307057 A1 * | 10/2014 | Kang | H04N 13/239 348/47 |
| 2015/0172635 A1 * | 6/2015 | Kimmel | H04N 13/0246 348/51 |

* cited by examiner

PROJECTED PATTERN MOTION/VIBRATION FOR DEPTH SENSING

CROSS-REFERENCE TO RELATED APPLICATIONS

This application claims the benefit of U.S. Provisional Application No. 62/041,289 filed on Aug. 25, 2014, the entirety of which is herein incorporated by reference.

BACKGROUND

Robotic systems, such as a robotic manipulator containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic manipulator to pick up objects based on predetermined knowledge of where objects are in the environment.

In some examples, a robotic system may use computer vision techniques to determine a representation of three-dimensional (3D) scene geometry. By way of example, a robotic system may triangulate information observed from at least two known viewpoints to determine a representation of 3D scene geometry. For instance, a stereo imaging system can be used to determine the depth to points in a scene, as measured from the center point of the line between their focal points (i.e., the baseline). If corresponding features in two or more images of an object are identified, a set of rays generated by the corresponding points may be intersected to find the 3D position of the object or depth to the object. In some instances, the 3D scene geometry may be represented in a depth map or depth image which contains information relating to the distance of surfaces of objects in a scene from the focal point.

SUMMARY

The resolution of 3D scene geometry can be improved by combining depth images determined from different viewpoints. For instance, if optical sensors of a stereo imaging system are attached to a robotic manipulator, adjusting the position of the robotic manipulator may enable the stereo imaging system to determine a different depth image, or multiple different depth images. A computing system can then determine a depth image having a higher resolution than a resolution of any of the individual depth images by combining (e.g., averaging or integrating) information from the individual depth images. However, physically moving the optical sensors to different viewpoints may introduce undesirable delay into the imaging process. Accordingly, the present disclosure provides methods and apparatuses that may help to determine high resolution 3D scene geometry information using a displacer coupled to a texture projector. As described herein, in some examples, a texture projector may project a random texture pattern onto an environment, and a displacer coupled to the texture projector may provide repeatedly change a position of the random texture pattern within the environment during a predetermined time period.

In one example, a method is provided that may involve causing, by one or more computing devices, a texture projector to project a texture pattern onto an environment. The method may further involve causing, by the one or more computing devices, a displacer coupled to the texture projector to repeatedly change a position of the texture pattern within the environment. Additionally, the method may involve receiving, by the one or more computing devices, stereo sensor data for the environment. The stereo sensor data may include a plurality of image pairs corresponding to a plurality of different positions of the texture pattern. Further, each image pair of the plurality of image pairs may include a first image captured from a first viewpoint of a first optical sensor and a second image captured from a second viewpoint of a second optical sensor. Also, the method may involve determining, by the one or more computing devices and using the stereo sensor data, an output including a virtual representation of the environment. The output may include a depth of at least one surface in the environment.

In another example, a non-transitory computer readable medium having stored therein instructions, that when executed by one or more processors of a computing device, cause the computing device to perform functions is disclosed. The functions may include causing a texture projector to project a texture pattern onto an environment. The functions may also include causing a displacer coupled to the texture projector to repeatedly change a position of the texture pattern within the environment. Additionally, the functions may include receiving stereo sensor data for the environment. The stereo sensor data may include a plurality of image pairs corresponding to a plurality of different positions of the texture pattern. Further, each image pair of the plurality of image pairs may include a first image captured from a first viewpoint of a first optical sensor and a second image captured from a second viewpoint of a second optical sensor.

In still another example, a system that includes a robotic manipulator, at least one projector, a displacer, at least two optical sensors, and a computing device is provided. The at least one projector may be coupled to the robotic manipulator and configured to project a texture pattern onto an environment. The displacer may be coupled to the at least one projector and configured to repeatedly change a position of the texture pattern within the environment during a predetermined time period. The at least two optical sensors may be configured to capture stereo sensor data for the environment. Additionally, the stereo sensor data may include a plurality of image pairs corresponding to a plurality of different positions of the at least one random texture pattern during the predetermined time period. Further, each image pair of the plurality of image pairs may include a first image captured from a first viewpoint of a first optical sensor and a second image captured from a second viewpoint of a second optical sensor. The computing device may be configured to determine, using the stereo sensor data, an output including a virtual representation of the environment. The output may include a depth of at least one surface in the environment.

In still another example, a system is provided that includes means for causing a texture projector to project a texture pattern onto an environment. The system further includes means for causing a displacer coupled to the texture projector to repeatedly change a position of the texture pattern within the environment during a predetermined time period. The system also includes means for receiving stereo sensor data for the environment. The stereo sensor data may include a plurality of image pairs corresponding to a plurality of different positions of the at least one random texture pattern during the predetermined time period. Further, each image pair of the plurality of image pairs may include a first image captured from a first viewpoint of a first optical sensor and a second image captured from a second viewpoint of a second optical sensor. Additionally, the system includes means for determining, using the stereo sensor data, an output including a virtual representation of the environment. The output may include a depth of at least one surface in the environment.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
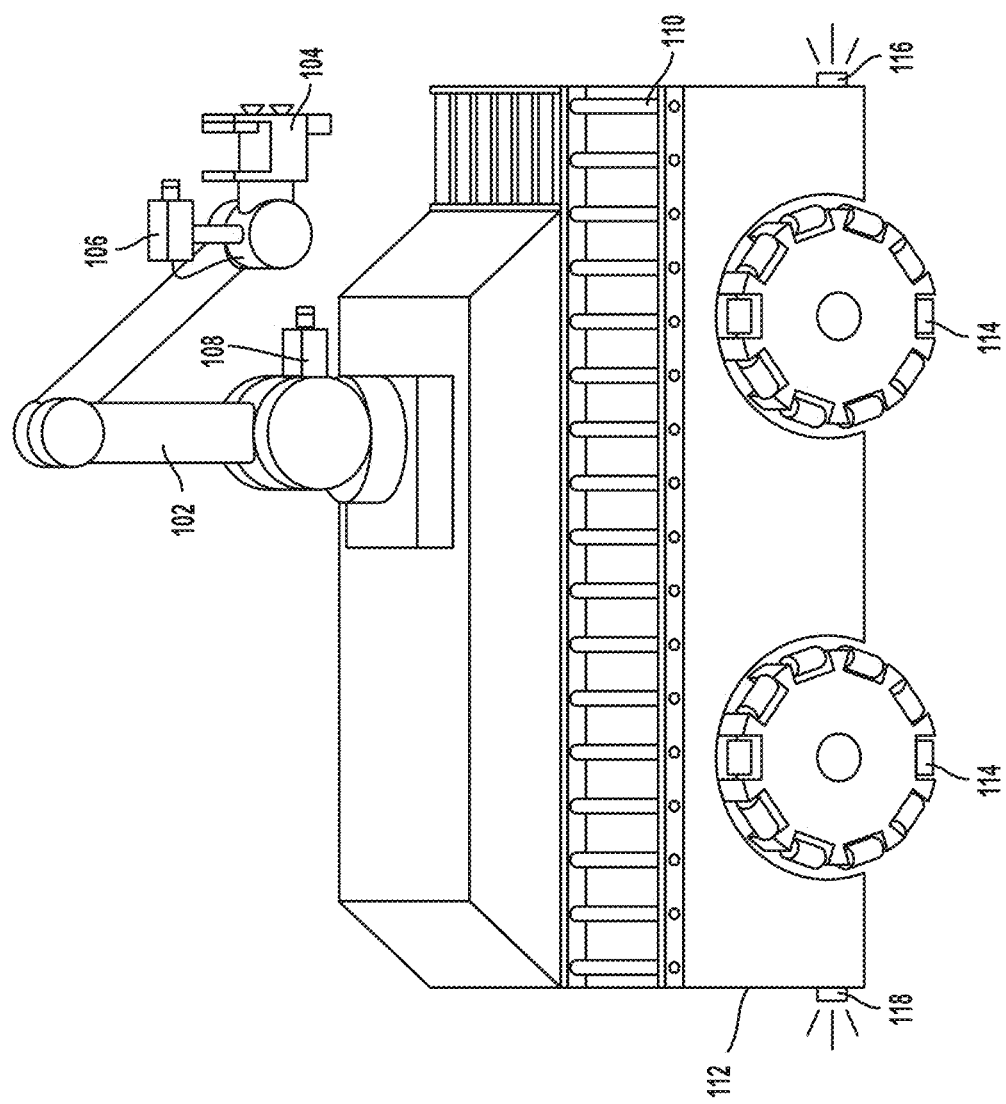
FIG. 1A shows a robotic arm mounted on a moveable cart, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Methods and apparatuses that may help to improve resolution of 3D scene geometry are provided herein. According to various embodiments, a displacer coupled to a texture projector may repeatedly change a position of a random texture pattern within an environment during a predetermined time period. In one example, one or more computing devices may receive stereo sensor data that is indicative of the environment as perceived from a first viewpoint of a first optical sensor and a second viewpoint of a second optical sensor during the predetermined time period. By way of example, the stereo sensor data may include a plurality of image pairs corresponding to a plurality of different positions of the random texture pattern within the environment. Each image pair may include a first image captured using the first optical sensor and a second image captured using the second optical sensor.

A computing device may then determine an output including a virtual representation of the environment using the received stereo sensor data. For instance, the computing device may determine a plurality of depth images using the plurality of image pairs, and then determine an output depth image that integrates information from the plurality of depth images. Advantageously, the output depth image may have a higher resolution than a resolution of any of the individual depth images.

In some examples, the displacer may cause variations in an orientation of the texture projector, variations in a position of the texture projector, or both. For instance, the displacer may include a vibration component that is configured to repeatedly provide a back-and-forth motion that physically alters a position of the texture projector, an orientation of the texture projector, or both.

In other examples, the displacer may be positioned between the texture projector and the environment, and may be configured to cause variations in a texture pattern projected onto the environment. For instance, the displacer may be an electronically-controllable optical element, such as an electronically-controllable lens or an electronically-controllable prism.

In some examples, by moving the projected pattern, the methods and apparatuses provided herein may help obtain 3D scene geometry with increased resolution without having to physically move any optical sensors. This may reduce the time required to image an environment, since it is no longer necessary to wait for a robotic manipulator or other device to physically move the optical sensors.

Further, in some instances, the displacer may provide a plurality of rapid displacements in a position of a projected texture pattern without having to be actively-controlled. For example, if the displacer is a vibration component, the vibration component may be configured to provide vibrations for a predetermined time period. Similarly, if the displacer is an electronically-controllable optical element, a computing device may provide different electronic signals to the optical element during a predetermined time period, in order to produce rapid displacements in the projected texture pattern. This may reduce the need to actively-control motors or actuators that control a position and/or orientation of the texture projector, and thereby reduce the processing load of an imaging system.

Moreover, the methods and apparatuses provided herein may enable a computing device to decrease the size of a matching window used to identify corresponding features between image pairs while maintaining a similar number of matching pixels, which can reduce the amount of time it takes to identify corresponding features. For instance, using a single 11×11 matching window involve 121 matching pixels while using five different 5×5 matching windows would involve 125 matching pixels. In an example in which an image pair associated with a first viewpoint and a second viewpoint includes a first image and second image respectively, a block matching algorithm may be used to determine corresponding features between the first image and the second image. For example, a segment of pixels of the first image (e.g., a 5×5, 11×11, or 21×21 window of pixels) may be matched against a range of segments of pixels in the second image to determine the closest matching segment of pixels in the second image. In accordance with the described methods, because a computing device may be configured to integrate information from multiple depth images, the computing device can execute the block matching algorithm using a smaller matching window, and still achieve similar, or perhaps more accurate, results. For instance, instead of using a large matching window of 11×11 pixels, a computing device may use a smaller matching window of 5×5 pixels. This smaller matching window may also increase the spatial resolution of individual depth images.

In addition, varying the position of the projected texture pattern can help reduce the phenomenon known as stereo pixel-locking. Many stereo imaging algorithms start by estimating disparities between images of an image pair at the integer level, and then refine the initial disparity estimates to sub-pixel accuracy to achieve more accurate depth information. For example, sub-pixel accuracy is sometimes estimated by fitting parabolas to a cost function used for matching data between a first and second image, and determining an analytical minimum cost. Unfortunately, this refinement sometimes results in pixel-locking: a disproportionate number of sub-pixel disparity estimates around the initial integer disparities. If multiple depth images are integrated without varying the position of the texture pattern, this effect can be undesirably accentuated. However, integrating depth images that correspond to varying texture patterns, as described herein, can help avoid accentuating any pixel-locking effects.

Various additional examples are described below, therefore the above examples are not meant to be limiting. Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Additionally, although portions of this disclosure refer to implementing the described methods and apparatuses to facilitate manipulation (e.g., loading and/or unloading) of boxes and/or other objects, the methods and apparatuses may be implemented in other environments as well. For instance, the methods and apparatuses may be implemented generally in any environment to determine the 3D geometry of the environment or 3D geometry of objects in the environment. By way of example, the methods and apparatuses may be implemented to help determine the 3D geometry of a room in a house or an office in a building, or perhaps the 3D geometry of a portion of an arena, conference center, or shopping mall. Similarly, the methods and apparatuses may be utilized in outdoor environments as well.

According to various embodiments, described herein are methods and systems for automated loading and/or unloading of boxes and/or other objects, such as into a storage container or from a vehicle. In some example embodiments, boxes or objects may be automatically organized and placed onto pallets (palletized) or automatically removed from pallets (depalletized). Within examples, automating the process of loading/unloading trucks and/or the process of palletizing/depalletizing objects may provide a number of industrial and business advantages.

According to various embodiments, automating the process of loading/unloading trucks and/or the process of palletizing/un-palletizing objects may include the incorporation of one or more robotic devices to move objects or perform other functions. In some embodiments, a robotic device can be made mobile by coupling the robotic device with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or 3D depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet while the term "depalletizing" refers to removing boxes from a pallet. In addition, the terms "palletizing" and "depalletizing" can each be used to imply the other.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wraparound front conveyor belt 110 may be included on the holonomic cart 112. In some examples, the wraparound front conveyer belt 110 may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 1B:
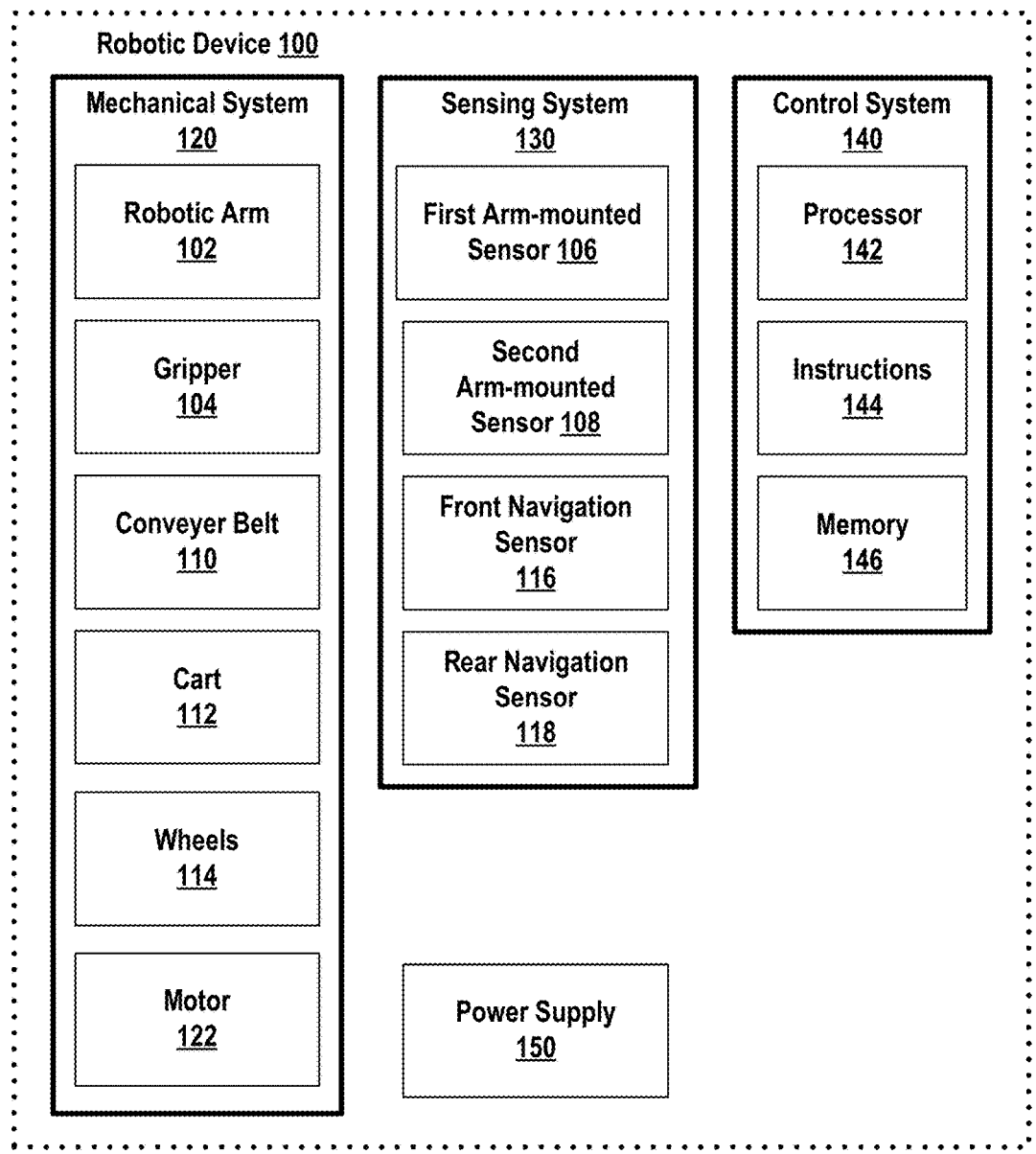
FIG. 1B is a functional block diagram illustrating a robotic device, according to an example embodiment.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors mounted on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, the floor/ceiling, and/or box faces. After modeling the floor, projecting objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distances from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suction devices can be activated on both sides of the seam to pick up both boxes at once, thereby doubling the throughput. In some embodiments, the suction devices can sense after a certain amount time whether they can successfully grip a surface, after which they may automatically shut off. In further embodiments, sections of the suction devices can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side-to-side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
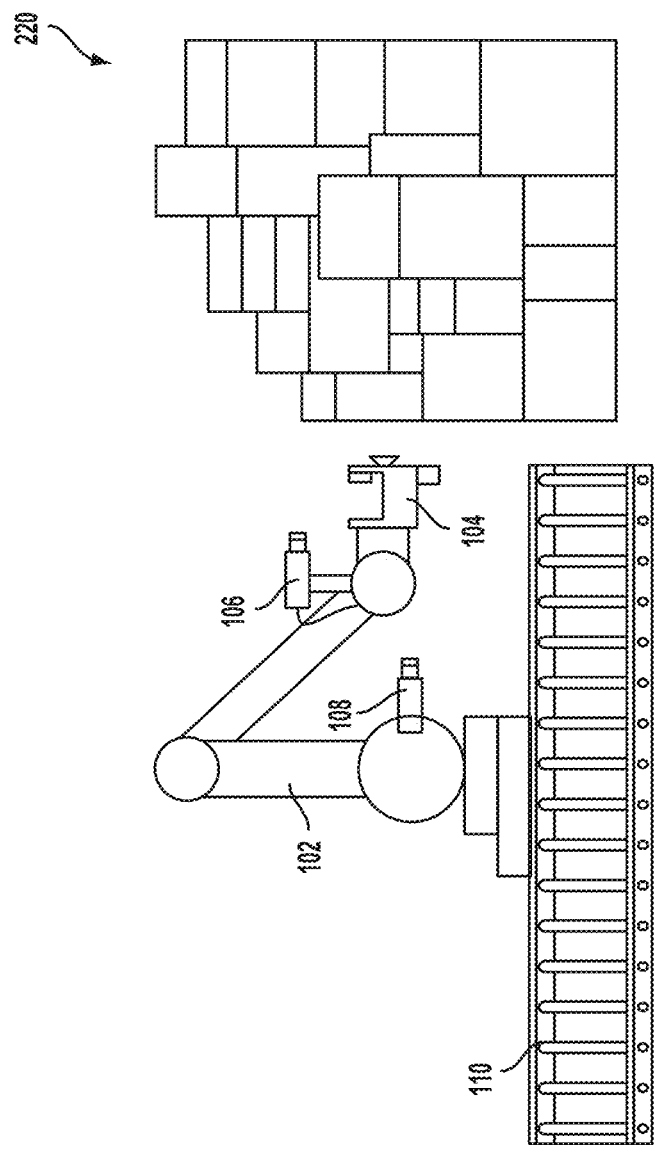
FIG. 2A shows a robotic arm and a stack of boxes, according to an example embodiment.

According to various embodiments, a perception guided robot is described. For instance, a robotic device may utilize a combination of perception together with planning to guide the robot arm to pick up a box and place the box where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
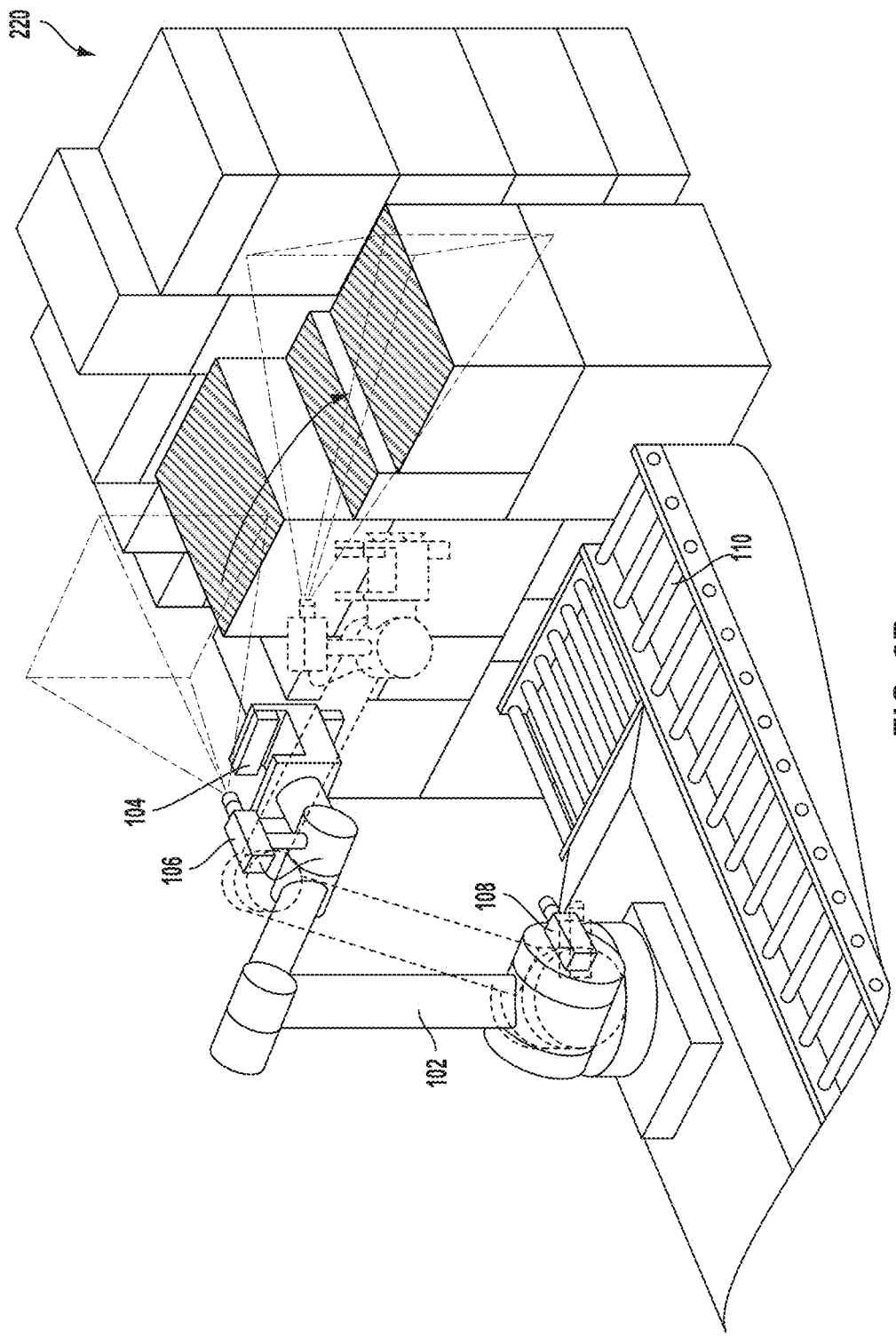
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key-points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may enable better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect the locations of objects of interest. Also, mathematical representations of objects may be used to look for anomalies such as a person entering into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order to model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map with distances as a third dimension). Examples of facades may include a wall of boxes in a truck, a top of a pallet stack containing boxes or other objects, or a top of a bin of jumbled objects.

Figure 2C:
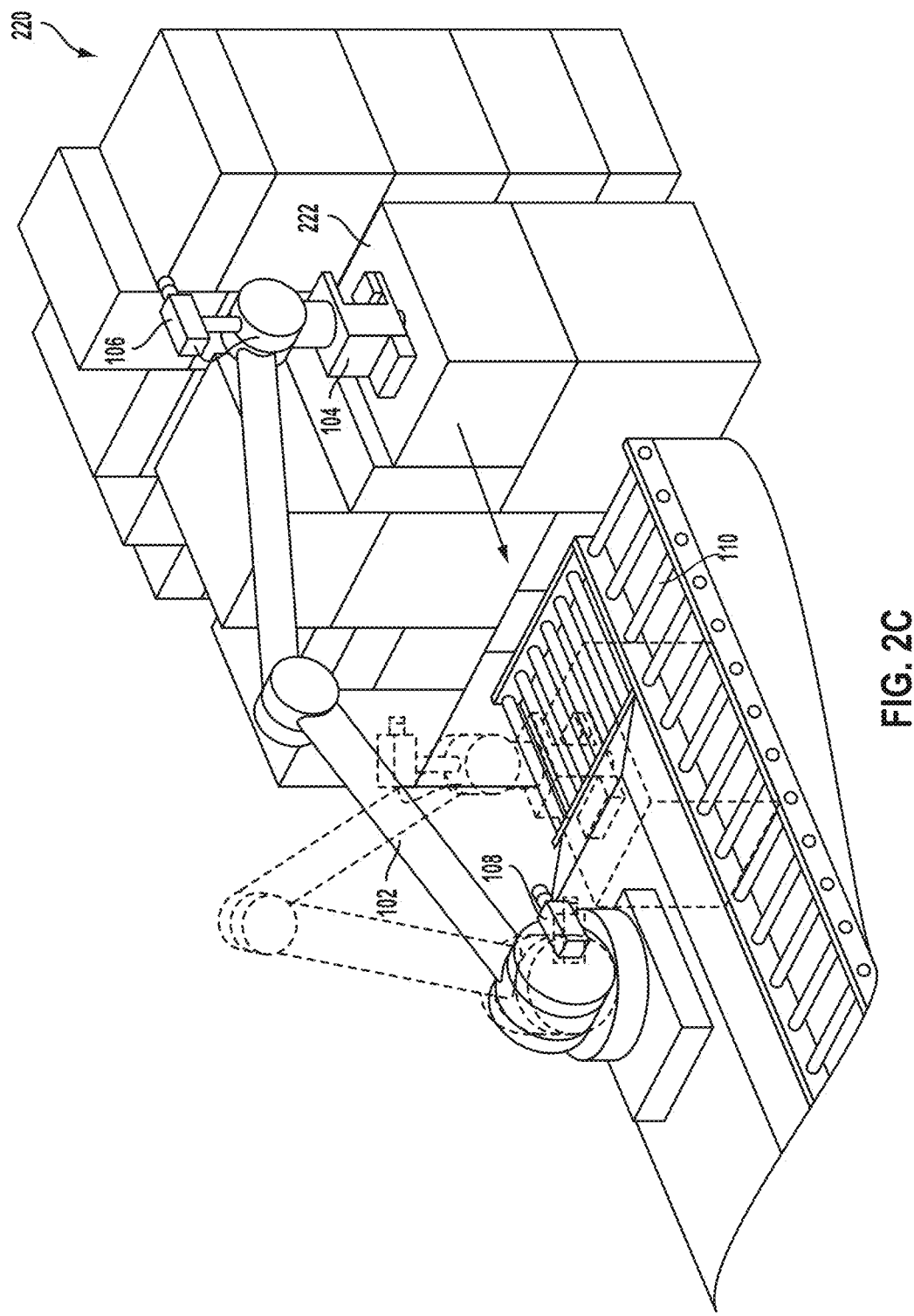
FIG. 2C shows the robotic arm from FIG. 2A moving a box, according to an example embodiment.

In further examples, a facade may be constructed from boxes, for instance to plan an order for picking up the boxes. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensors 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick up may be determined based on a facade representation. In other examples, an orthographic projection of an integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters defining a position of an object in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, or 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm to the right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or palletizing/depalletizing may be to achieve: (1) a dense packing with minimal air gaps in between boxes, and/or (2) a stable packing that will not easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items in real-time. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of a particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3:
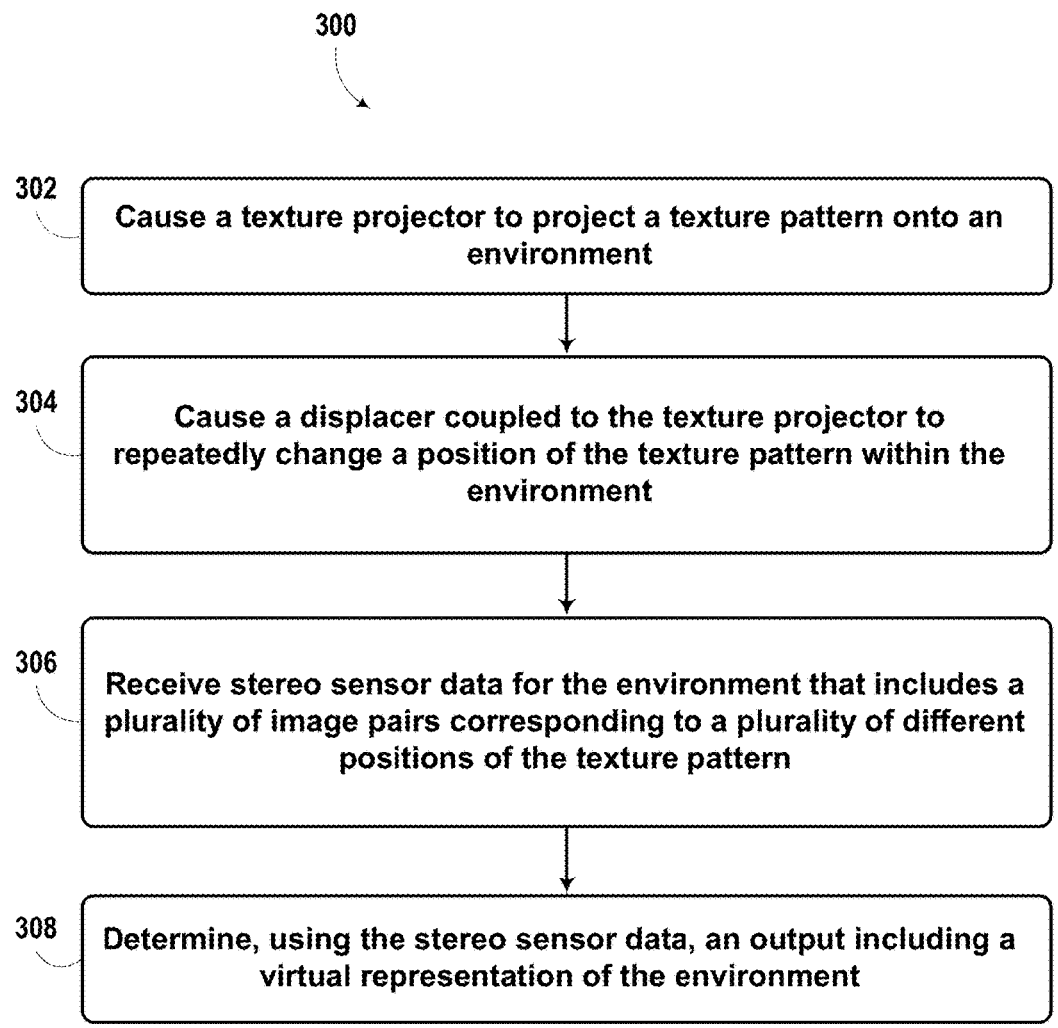
FIG. 3 is a block diagram of a method, according to an example embodiment.

Referring now to FIG. 3, FIG. 3 is a block diagram of an example method 300 for determining a virtual representation of an environment. Method 300 shown in FIG. 3 presents an embodiment of a method that could be used or implemented by the robotic device 100 of FIG. 1B, for example, or more generally by one or more components of any computing device. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 300 and other processes and methods disclosed herein, each block in FIG. 3 may represent circuitry that is wired to perform the specific logical functions in the process.

In one embodiment, functions of the method 300 may be performed by a control system, such as the control system 140 of FIG. 1B. In other embodiments, the functions of the method 300 may be distributed across multiple control systems that are configured to cause a plurality of rapid displacements in a position of a texture pattern and determine a virtual representation of the environment based on stereo sensor data received from two or more optical sensors.

Initially, at block 302, the method 300 involves causing a texture projector to project a texture pattern onto an environment. In some embodiments, the texture projector may include a light source, projection optics, and a liquid crystal display (LCD) or other method of interrupting light with a pattern. For instance, the light source may be a laser or a laser-diode. In other embodiments, the texture projector may generate a laser-based pattern by shining light on a diffraction grating or a diffusion grating. For instance, the texture projector may generate a laser-based pattern by illuminating a plane of small random lenslets. Each lenslet may act as a spherical radiator, and the resultant phase differences from many such lenslets may produce a far-field speckle pattern. The size of the speckles can be modulated by changing the beam size, and the field of view of the pattern can be controlled based on the refraction properties of the lenslets, and interposing lenses after the lenslets to image the speckles. Alternatively, the pattern may be generated by a diffractive holographic pattern that images a fine-grained pattern based on interference of the coherent light from the laser.

In some examples, the texture pattern may be may be a random pattern of light, such as visible or infrared light, that is intentionally projected into a scene in order to construct easily identifiable features that can then be used to determine matching correspondences between two or more images. By way of example, the texture pattern may include a 2D pattern of spots or dots, where the spots or dots are uncorrelated in a random pattern. In various embodiments, the texture pattern may be constant in time or may be varying as a function of time. Thus, in some examples, the computing device may cause the texture projector to project multiple texture patterns (e.g., multiple randomly generated texture patterns or multiple predetermined texture patterns) successively in time.

In some examples, the texture projector may be coupled to a robotic device, such as the robotic device 100. For instance, the texture projector may be coupled to the robotic arm 102 of FIG. 1A. Additionally or alternatively, the texture projector may be mounted on the cart 112 of FIG. 1A. In another instance, the texture projector may be mounted to the walls or ceiling of a room, or rails connected to the walls or ceiling of the room. Further, the texture projector may be controlled by a computing device, such as the control system 140 of FIG. 1B.

At block 304, the method 300 involves causing a tangible displacement coupled to the texture projector to repeatedly change a position of the texture pattern within the environment. In line with the discussion above, the displacer may take a number of forms, depending on the desired implementation.

In one example, the displacer may be configured to cause variations in an orientation of the texture projector, a position of the texture projector, or both. By way of example, the displacer may be a vibration component that is configured to repeatedly provide a back-and-forth motion that physically alters a position of the texture projector, an orientation of the texture projector, or both. In one implementation, a computing device may provide a command to the vibration component that causes the vibration component to randomly vibrate along one, or perhaps multiple axes, for a predetermined time period (e.g., half a second, one second, ten seconds, etc.). As a result, the vibration component may produce a plurality of rapid displacements in the position of a projected texture pattern within the environment.

In another example, the displacer may be configured to cause variations in the texture pattern projected onto the environment. For instance, the displacer may take the form of an electronically-controllable optical element that is positioned between the texture projector and the environment. In one implementation, the electronically-controllable optical element may be an electronically-controllable lens through which the texture pattern is projected. To change the position of the texture pattern within the environment, a computing device may cause variations in a shape of the electronically-controllable lens. For instance, the computing device may repeatedly provide a different voltage within a predetermined voltage range (or different current within a predetermined current range) to the electronically-controllable lens that causes corresponding variations in the shape of the electronically-controllable lens. As a result, the position or size of the projected texture pattern within the environment may vary, depending on the current shape of the electronically-controllable lens. In some examples, the different voltages or different currents may be random voltages and random currents that consequently produce random movements of the projected texture pattern. However, the different voltages or different currents need not be random voltages or random currents, as long as the voltages or currents vary over time.

In another implementation, the electronically-controllable optical element may be an electronically-controllable prism through which the texture pattern is projected. For instance, the electronically-controllable prism may be a reflective prism having at least one reflection angle that varies depending on a voltage level or current level that is applied to the reflective prism. To change the position of the texture pattern within the environment, a computing device may cause variations in the at least one reflection angle of the prism. For instance, the computing device may repeatedly provide a different voltage (or different current) to the electronically-controllable prism that causes a corresponding variation in at least one reflection angle. As a result, the position of the projected texture pattern within the environment may vary, depending on the current reflection angle(s) of the prism. In some instances, the electronically-controllable prism may include multiple controllable reflection angles, such that the prism may be controlled to provide rapid displacements in multiple directions.

At block 306, the method 300 involves receiving stereo sensor data for the environment that includes a plurality of image pairs corresponding to a plurality of different positions of the texture pattern. In one instance, individual image pairs of the plurality of image pairs may include a first image captured from a first viewpoint of a first optical sensor and a second image captured from a second viewpoint of a second optical sensor. Note that the first viewpoint of the first optical sensor is different from the second viewpoint of the second optical sensor, since the first optical sensor and the second optical sensor may be separated from each other by a baseline distance.

The first optical sensor and the second optical sensor may include any types of optical sensors, such as charge-coupled device (CCD) image sensors, complementary metal-oxide-semiconductor (CMOS) image sensors, or other types of sensors configured to convert an optical image into an electronic signal. By way of example, the first optical sensor or the second optical sensor may be a red/green/blue (RGB) infrared (IR) camera. Additionally, the first optical sensor or the second optical sensor may be a RGB camera. The RGB IR camera(s) or RGB camera(s) may be global shutter cameras, such that the pixels of a particular camera store information at the same time.

In other embodiments, the stereo sensor data may include images from more than two optical sensors. For example, the stereo sensor data may include a plurality of first image pairs from a first stereo pair of optical sensors and a plurality of second image pairs from a second stereo pair of optical sensors. As another example, the stereo sensor data may include a plurality of first image pairs from a first stereo pair of optical sensors located at a first position and a plurality of other images from a third optical sensor located at another position.

And at block 308, the method 300 involves determining, using the stereo sensor data, an output including a virtual representation of the environment. By way of example, the output may include a depth of at least one surface in the environment. In one implementation, one or more computing devices may determine a plurality of depth images corresponding to the plurality of image pairs of the stereo sensor data. Further, the one or more computing devices may then integrate information from the plurality of depth images to determine an output depth image having a higher resolution than a resolution of individual depth images of the plurality of depth images.

As a particular example, for each image pair of a plurality of image pairs, a block matching algorithm may be used to determine corresponding features between a first image and a second image of the image pair. Using the block matching algorithm, a segment of pixels of the first image (e.g., a 5×5, 11×11, or 21×21 window of pixels) may be matched against a range of segments of pixels in the second image to determine the closest matching segment of pixels in the second image. For example, the closest matching segment of pixels may be determined by minimizing a match function. Subsequently, given the pixel positions of a pair of corresponding features, one of various triangulation methods can be used to reconstruct the 3D position of the identified feature. According to the process of triangulation, the 3D position (x, y, z) of a point P can be reconstructed from the perspective projection of P on the image planes of a first sensor and a second sensor, given the relative position and orientation of the two sensors. Therefore, if the pixel positions of a pair of corresponding features are known, and the relative position and orientation of the two sensors is known, the 3D position of the feature can be determined.

The one or more computing devices may then combine information from multiple depth images to determine a single, super-resolution depth image. In one implementation, integration may be done using a volumetric system called truncated signed distance function (TSDF), which allows efficient integration of depth images. The TSDF volume may consist of a regular 3D grid, containing a signed scalar field indicating the distance to the nearest depth point. For each depth pixel in an input image, a projected ray may be averaged into the volume, with zero in the cell exactly at the depth 3D point, positive values closer to the camera, and negative values further away. Successive depth images that are registered to the volume may then be integrated. Therefore, a surface is implicitly represented by the volume, at those points in the volume where the scalar field switches sign. In some cases, either 3D points or explicit surface information may then be extracted for use as the input to other algorithms, such as obstacle avoidance. The 3D points or surface information may be extracted in several different ways. For example, the information may be extracted using the marching cubes algorithm, which constructs a surface from the TSDF, and as a side effect, also extracts the 3D points represented by the TSDF. Other integration approaches may also be used.

In line with the discussion above, the displacer may take a variety of forms, depending on the desired implementation. Referring now to FIGS. 4A-7, various example arrangements are disclosed.

Figure 4A:
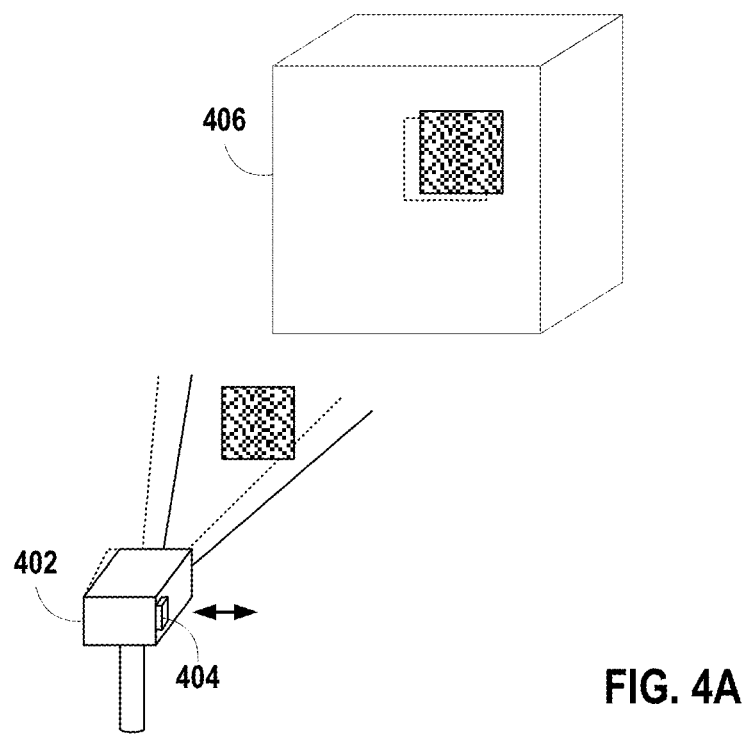
FIGS. 4A and 4B are conceptual illustrations of example arrangements of a texture projector and a displacer.
Figure 4B:
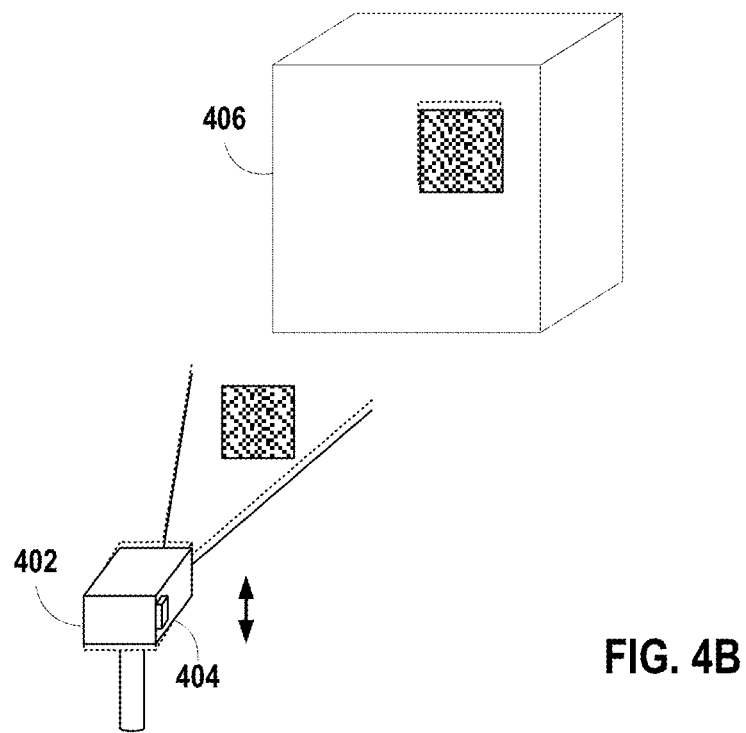

FIGS. 4A and 4B are conceptual illustrations of example arrangements of a texture projector 402 and a displacer 404. In particular, FIGS. 4A and 4B conceptually illustrate an embodiment in which the displacer 404 may take the form of a vibration component. By way of example, the vibration component may be a MicroElectroMechanical Systems (MEMS) device that is controllable by a computing device. For instance, a computing device may provide a signal to the MEMS device that causes the MEMS device to vibrate at a constant frequency, or at multiple different frequencies.

As discussed above, the vibration component may be coupled to the texture projector 402, and may be configured to repeatedly provide a back-and-forth motion that physically alters an orientation of the texture projector. As depicted in FIG. 4A, in some implementations, the vibration component may be configured to provide back-and-forth motions in a horizontal or lateral direction which cause variations in a horizontal orientation of the projector 402. FIG. 4A illustrates two example orientations of the projector 402 that the projector 402 may occupy over the course of a predetermined time period during which the vibration component is vibrating. Specifically, FIG. 4A shows a current orientation of the projector 402 and a current position of a texture pattern projected onto an object 406. Additionally, FIG. 4A shows a previous orientation of the projector 402 and a previous position of the texture pattern projected onto the object 406. For illustration purposes, the previous orientation of the projector 402 and the previous position of the texture pattern are shown using dashed lines. Thus, the displacer 404 may cause variations in a horizontal orientation of the projector 402, which in turn may cause variations in a position of the texture pattern on the object 406.

Additionally, in some implementations, the vibration component may be configured to provide back-and-forth motions in a vertical direction. FIG. 4B illustrates two example orientations of the projector 402 that the projector 402 may occupy over the course of a predetermined time period during which the vibration component is vibrating. Specifically, FIG. 4B shows a current orientation of the projector 402 and a current position of a texture pattern projected onto the object 406. Additionally, FIG. 4B shows a previous orientation of the projector 402 and a previous position of the texture pattern projected onto the object 406. For illustration purposes, the previous position of the projector 402 and the previous position of the texture pattern are again shown using dashed lines. Thus, the displacer 404 may cause variations in a vertical orientation of the projector 402, which in turn may cause variations in a position of the texture pattern on the object 406.

In some instances, the example projector 402 shown in FIGS. 4A and 4B may be coupled to a robotic manipulator (not shown).

Figure 5:
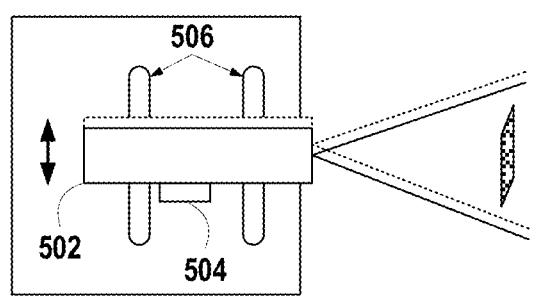
FIG. 5 is another conceptual illustration of an example arrangement of a texture projector and a displacer.

FIG. 5 is another conceptual illustration of an example arrangement of a texture projector 502 and a displacer 504. Specifically, FIG. 5 illustrates an example arrangement in which the displacer 504 may vary the position of the projector 502. As shown in FIG. 5, the projector 502 may be attached to two rails 506, such that the projector 502 may slide along the rails 506. For instance, there may be two attachment components (not shown) coupled to the bottom of the projector 502 and configured to slide within the rails 506. In one implementation the attachment components may be wheels; however, other configurations are also possible.

In one example, the displacer 504 may be a vibration component (e.g., a MEMS device) configured to repeatedly provide a back-and-forth motion for a predetermined time period that causes the projector 502 to slide along the rails

506, thereby altering the position of the projector 502. For instance, FIG. 5 illustrates a current position of the projector 502 as well as a previous position of the projector 502 that the projector 502 may occupy over the course of the predetermined time period. For illustration purposes, the previous position of the projector 502 is shown using dashed lines. In the example arrangement depicted in FIG. 5, the displacer 504 may take other forms as well. Furthermore, the example projector 502 may be coupled to a robotic manipulator (not shown).

Figure 6:
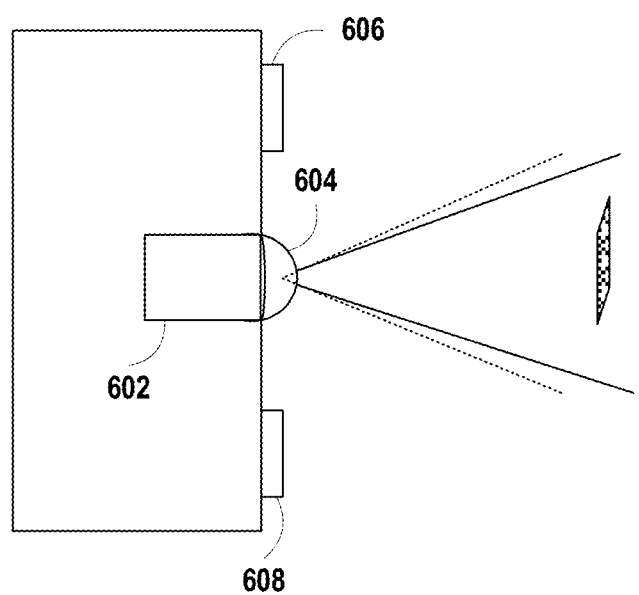
FIG. 6 is still another conceptual illustration of an example arrangement of a texture projector and a displacer.

FIG. 6 is still another conceptual illustration of an example arrangement of a texture projector 602 and a displacer 604. Additionally, the example arrangement of FIG. 6 includes a first optical sensor 606 and a second optical sensor 608 that are each located at different positions such that the first optical sensor 606 and the second optical sensor 608 capture images from different respective viewpoints. In one embodiment, the projector 602, first optical sensor 606, and second optical sensor 608 may be connected to a single structure that is coupled to a robotic manipulator. However, the example is not meant to be limiting. In other examples, the first optical sensor 606 and the second optical sensor 608 may be connected to a different structure that is coupled to the robotic manipulator, may be coupled to a different robotic manipulator, or may be coupled to a fixed structure such as a wall or ceiling.

In the example arrangement of FIG. 6, the displacer 604 is depicted as an electronically-controllable lens. In line with the discussion above, the electronically-controllable lens may be a lens through which a texture pattern is projected. In order to cause variations in the projected texture pattern, a computing device may provide different voltages or currents to the electronically-controllable lens that cause variations in a shape of the electronically-controllable lens. The variations in the shape of the electronically-controllable lens may in turn produce variations in the projected texture projection. By way of example, FIG. 6 depicts two example variations in the texture pattern that may occur over the course of a predetermined time period. In particular, FIG. 6 depicts a previous texture pattern, shown using the dashed lines, which is wider than a current texture pattern, shown using the solid lines. Thus, varying the shape of the electronically-controllable lens may produce variations in the projected texture pattern.

Figure 7:
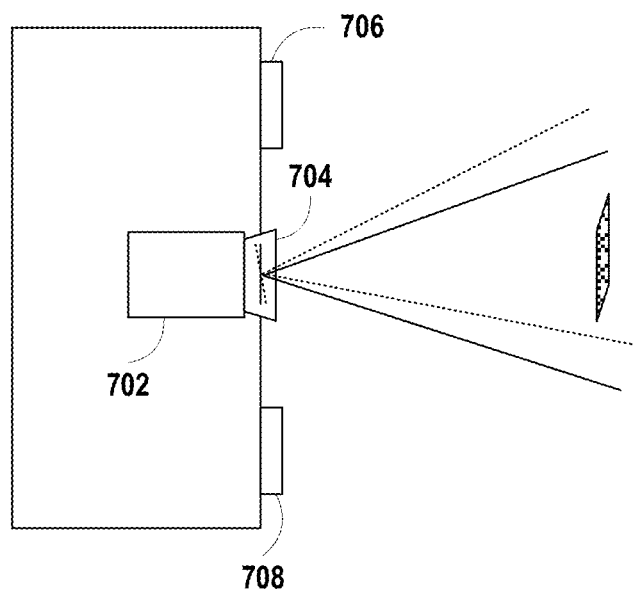
FIG. 7 is still another conceptual illustration of an example arrangement of a texture projector and a displacer.

FIG. 7 is still another conceptual illustration of an example arrangement of a texture projector 702 and a displacer 704. Additionally, the example arrangement of FIG. 7 includes a first optical sensor 706 and a second optical sensor 708. As described above with reference to FIG. 6, in one embodiment, the projector 702, first optical sensor 706, and second optical sensor 708 may be connected to a single structure that is coupled to a robotic manipulator. Alternatively, the first optical sensor 706 and the second optical sensor 708 may be connected to a different structure that is coupled to the robotic manipulator, may be coupled to a different robotic manipulator, or may be coupled to a fixed structure such as a wall or ceiling.

In the example arrangement of FIG. 7, the displacer 704 is depicted as an electronically-controllable prism through which a texture pattern is projected. In order to cause variations in the projected texture pattern, a computing device may provide different voltages or currents to the electronically-controllable prism that cause variations in at least one reflection angle of the electronically-controllable prism. By way of example, the FIG. 7 depicts two example variations in the texture pattern that may occur over the course of a predetermined time period. In particular, FIG. 7 depicts a previous texture pattern, shown using the dashed lines, which is shown in a different position than a current texture pattern, shown using the solid lines. In one instance, the previous texture pattern may have been projected in a slightly different direction than the current texture pattern since a reflection angle of the prism was different at a time when the previous texture position was projected. Thus, varying a reflection angle of the electronically-controllable prism may produce variations in a direction in which the texture pattern is projected.

Figure 8A:
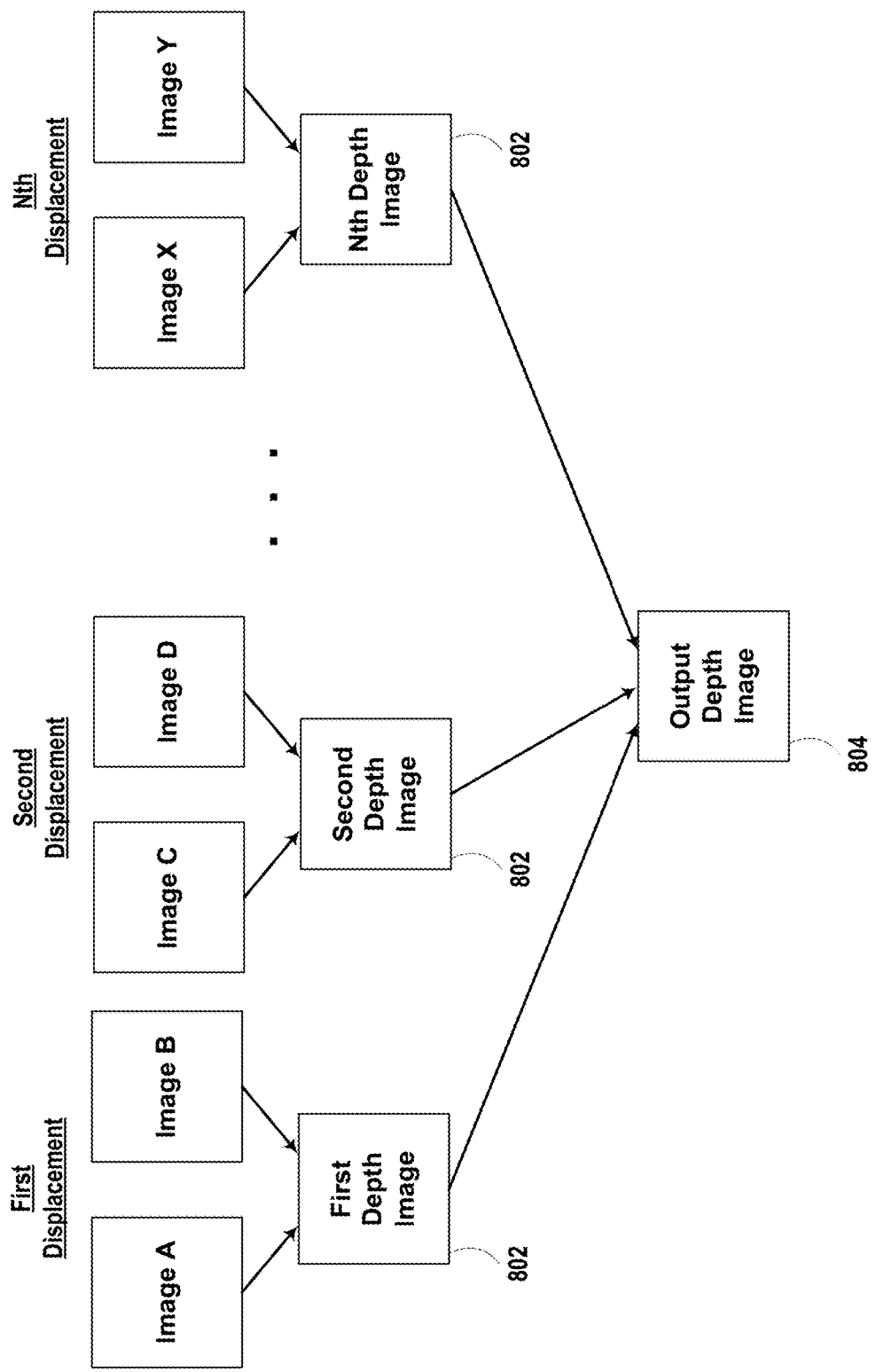
FIGS. 8A and 8B are conceptual illustrations of integrating information from multiple depth images.

Referring now to FIG. 8A, FIG. 8A is a conceptual illustration of integrating information from multiple depth images 802. In line with the discussion above, a computing device may determine multiple depth images 802 using a plurality of image pairs corresponding to a plurality of different displacements in a position of a texture pattern within the environment. For example, a first image pair may include a first image (image A) and a second image (image B) corresponding to a first displacement, a second image pair may include a first image (image C) and a second image (image D) corresponding to a second displacement, and so on. And one or more computing devices may determine a first depth image using the first image pair, determine a second depth image using the second image pair, and so forth.

Given the multiple depth images 802, the computing device may integrate information from the multiple depth images to determine an output depth image 804. As discussed above, the computing device may use any of a variety of integration approaches, such as using the TSDF volumetric system. Advantageously, the output depth image 804 may have a higher resolution than a resolution of any of the multiple depth images 802.

Figure 8B:
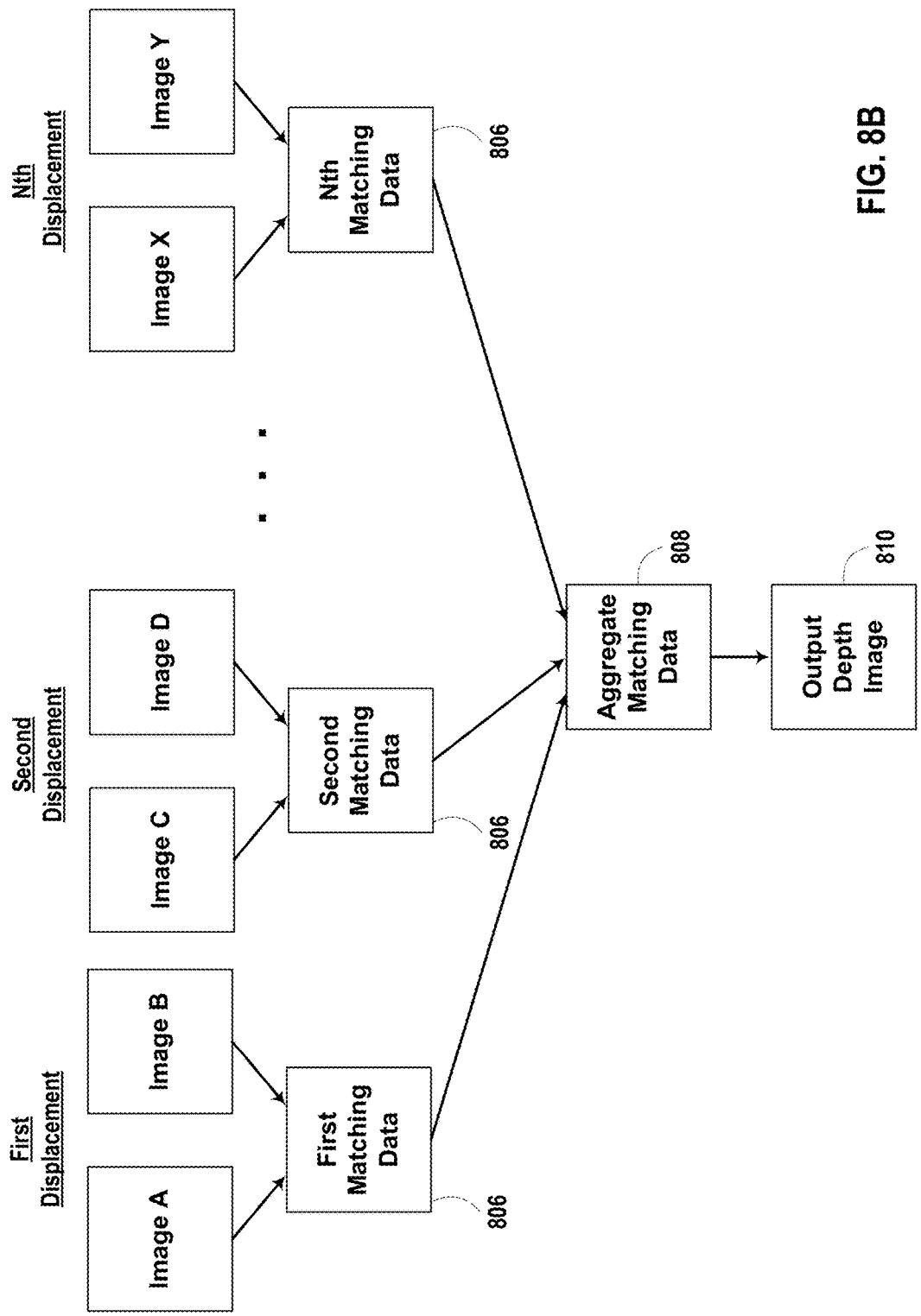

FIG. 8B is another conceptual illustration of integrating information from multiple stereo pairs. In contrast to the approach illustrated in FIG. 8A in which an individual depth image is computed from each stereo pair, depth information is computed across all stereo pairs in the approached illustrated in FIG. 8B. In one example, for each pixel in image A, a small patch surrounding the pixel is compared to a set of patches in image B, yielding first matching data. Similarly, for each pixel in image C, a small patch surrounding the pixel is compared to a set of patches in image D, yielding second matching data, and so on. After identifying correspondences within each of the stereo pairs, the computing device may sum the matching data 806 from each stereo pair, yielding aggregate matching data 808. Finally, the computing device may determine an output depth image 810 by determining, for each pixel, the best match in the aggregate matching data 808, and computing a depth estimate for the pixel using the best match. Thus, the output depth image 810 may be computed across all of the stereo pairs.

Figure 9A:
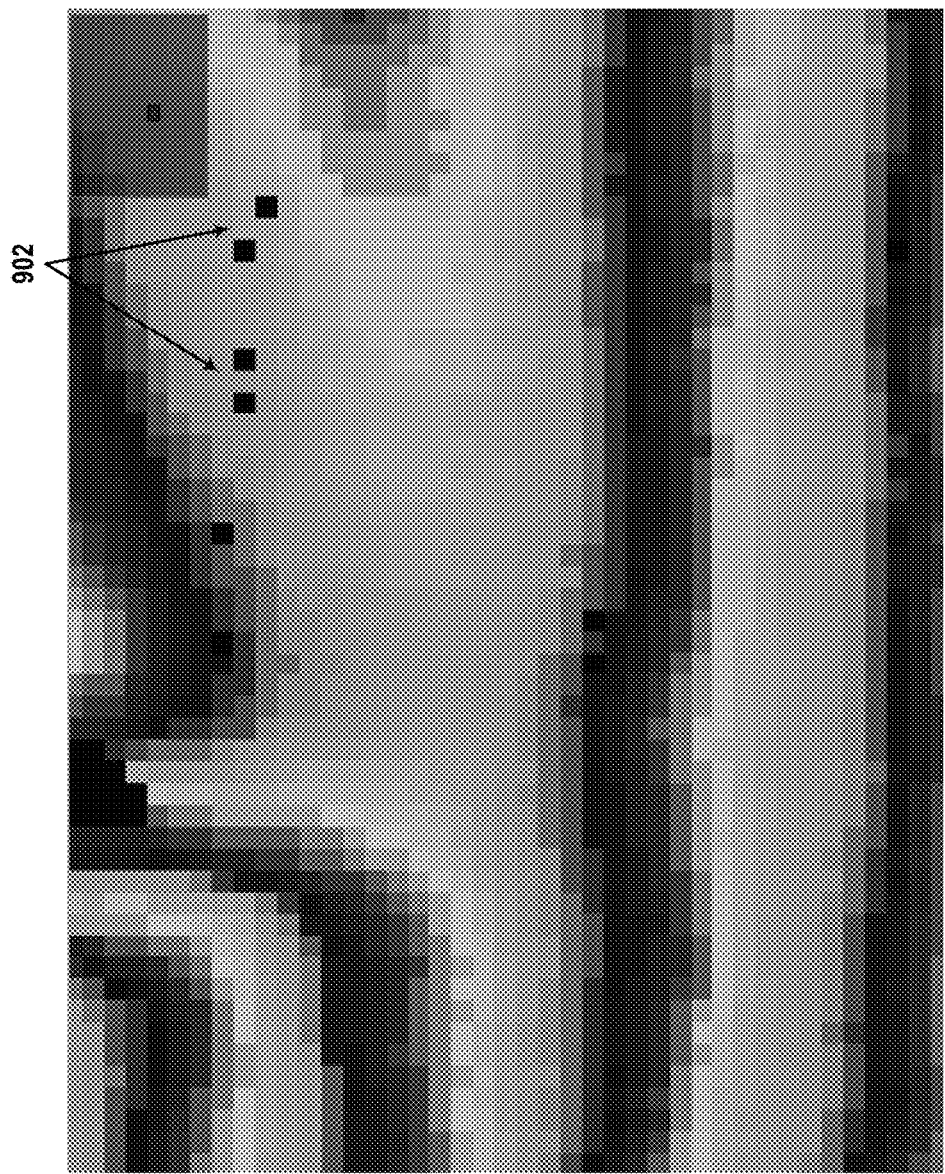
FIGS. 9A, 9B, and 9C are conceptual illustrations of example virtual representations of an environment.
Figure 9B:
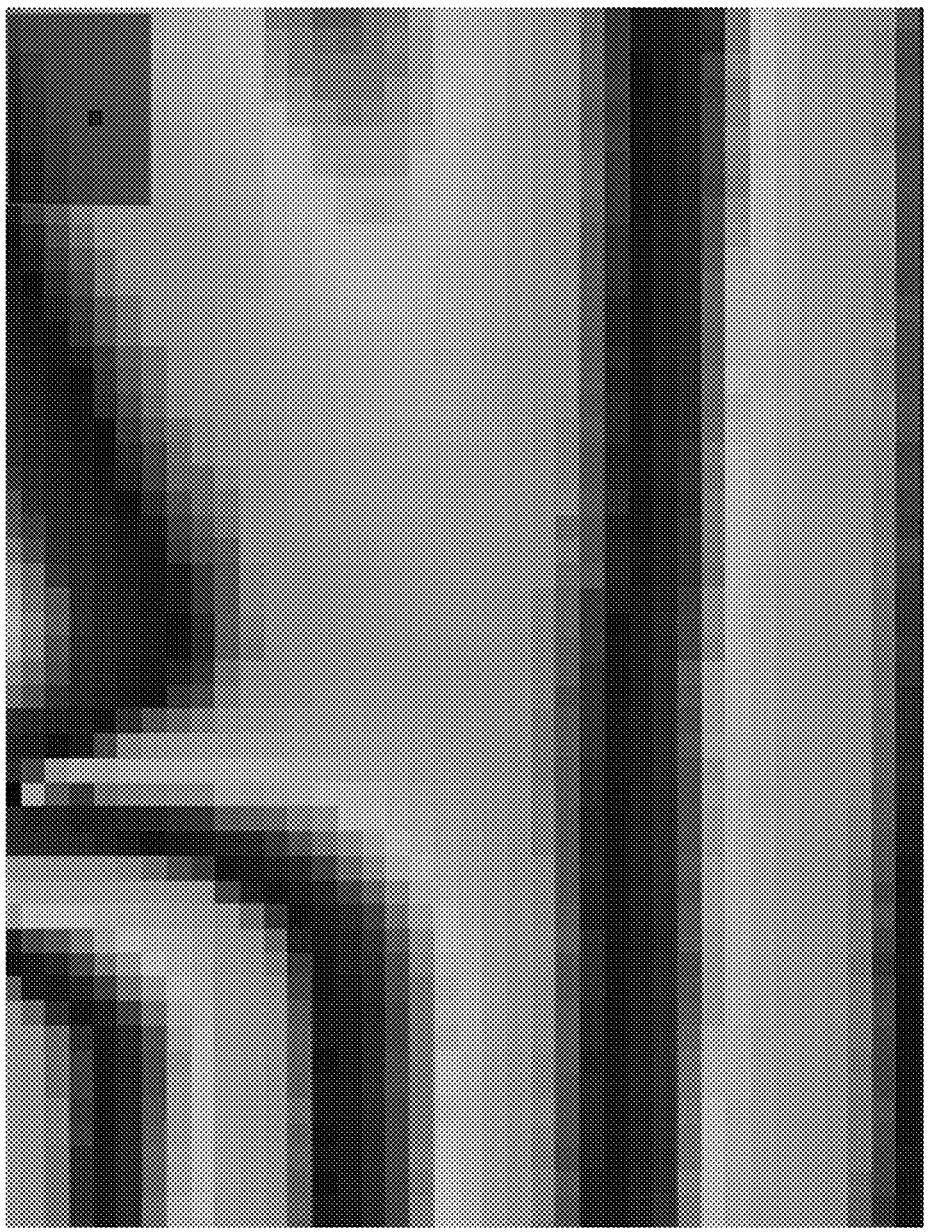
Figure 9C:
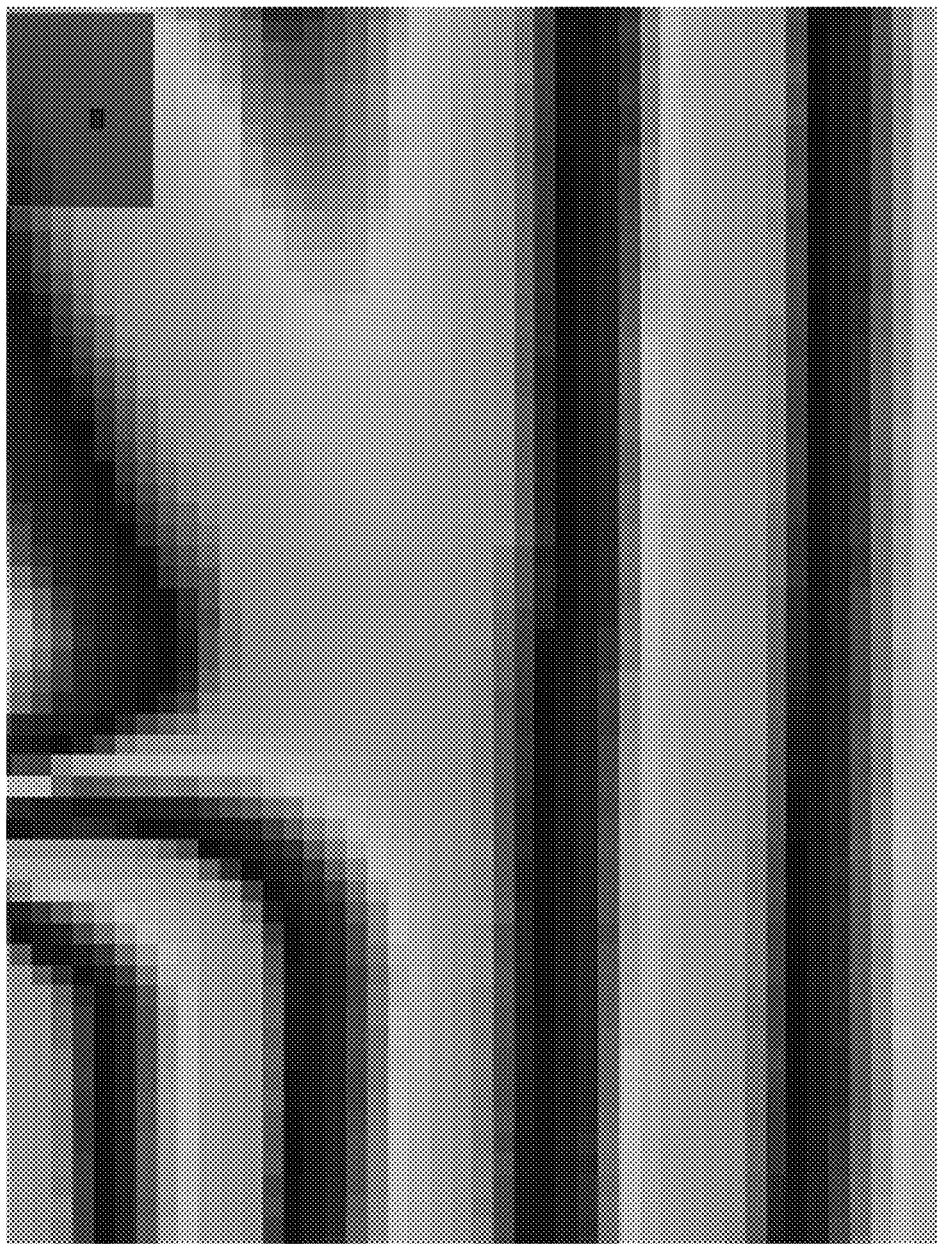

Finally, FIGS. 9A, 9B, and 9C are conceptual illustrations of example virtual representations of an environment. In line with the discussion above, the virtual representation of the environment may include a depth image that indicates distances to surfaces in the environment. Depending on the number of depth images that are integrated, the resolution of the output depth image may vary. For example, FIG. 9A illustrates a depth image determined using a single stereo pair. Note that there a few dropouts 902 in FIG. 9A. These dropouts represent pixels for which a depth estimate was inconclusive or undeterminable using the single stereo pair. Further, FIG. 9B illustrates a depth image determined by combining information from four stereo pairs. Note that the depth image in FIG. 9B has a greater detail of depth and higher resolution than the depth image in FIG. 9A. Still further, FIG. 9C illustrates a depth image determined by combining eight stereo pairs. Note that the depth image of FIG. 9C is smoother than the depth images in FIGS. 9A and 9B and includes fewer dropouts. Thus, as the number of depth images that are integrated increases, the detail of depth information and resolution of the output depth image may increase.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described examples, it is intended that all matters in the preceding description and shown in the accompanying figures be interpreted as illustrative and not in a limiting sense. Further, it is intended to be understood that the following further describe aspects of the present description.

What is claimed is:

1. A method comprising:
   causing, by one or more computing devices, a texture projector to project a texture pattern onto an environment;
   causing, by the one or more computing devices, a displacer coupled to the texture projector to repeatedly change a position of the texture pattern within the environment using a MicroElectroMechanical System (MEMS) device configured to repeatedly provide a back-and-forth motion that physically alters a position of the texture projector on a predefined path along a rail while the texture projector projects the texture pattern, wherein the MEMS device provides the back-and-forth motion at one or more frequencies based on a signal received by the MEMS device from the one or more computing devices;
   receiving, by the one or more computing devices, stereo sensor data for the environment, wherein the stereo sensor data comprises a plurality of image pairs corresponding to a plurality of different positions of the texture pattern, and wherein each image pair of the plurality of image pairs comprises a first image captured from a first viewpoint of a first optical sensor and a second image captured from a second viewpoint of a second optical sensor; and
   determining, by the one or more computing devices and using the stereo sensor data, an output including a virtual representation of the environment, wherein the output comprises a depth of at least one surface in the environment.

2. The method of claim 1, wherein determining the output including the virtual representation of the environment using the stereo sensor data comprises:
   determining, using the plurality of image pairs, a plurality of depth images; and
   determining an output depth image that integrates information from the plurality of depth images, wherein the output depth image has a higher resolution than a resolution of individual depth images of the plurality of depth images.

3. The method of claim 1, wherein the displacer is positioned between the texture projector and the environment and configured to cause variations in the texture pattern projected onto the environment.

4. The method of claim 3, wherein the displacer comprises an electronically controllable optical element coupled to the texture projector.

5. The method of claim 4, wherein the electronically-controllable optical element comprises an electronically-controllable lens through which the texture pattern is projected, and wherein causing the displacer to repeatedly change the position of the texture pattern within the environment comprises causing variations in a shape of the electronically-controllable lens.

6. The method of claim 4, wherein the electronically-controllable optical element comprises an electronically-controllable prism through which the texture pattern is projected, and wherein causing the displacer to repeatedly change the position of the texture pattern within the environment comprises causing variations in at least one reflection angle of the electronically-controllable prism.

7. The method of claim 1, wherein causing the displacer to repeatedly change the position of the texture pattern within the environment comprises causing the displacer to repeatedly change the position of the texture pattern in a plurality of directions.

8. A non-transitory computer-readable medium having stored therein instructions, that when executed by one or more processors of a computing device, cause the computing device to perform functions comprising:
   causing a texture projector to project a texture pattern onto an environment;
   causing a displacer coupled to the texture projector to repeatedly change a position of the texture pattern within the environment using a MicroElectroMechanical System (MEMS) device configured to repeatedly provide a back-and-forth motion that physically alters a position of the texture projector on a predefined path along a rail while the texture projector projects the texture pattern, wherein the MEMS device provides the back-and-forth motion at one or more frequencies based on a signal received by the MEMS device from the one or more computing devices;
   receiving stereo sensor data for the environment, wherein the stereo sensor data comprises a plurality of image pairs corresponding to a plurality of different positions of the texture pattern, and wherein each image pair of the plurality of image pairs comprises a first image captured from a first viewpoint of a first optical sensor and a second image captured from a second viewpoint of a second optical sensor; and
   determining, using the stereo sensor data, an output including a virtual representation of the environment, wherein the output comprises a depth of at least one surface in the environment.

9. The non-transitory computer-readable medium of claim 8, wherein determining the output including the virtual representation of the environment using the stereo sensor data comprises:
- determining, using the plurality of image pairs, a plurality of depth images; and
- determining an output depth image that integrates information from the plurality of depth images, wherein the output depth image has a higher resolution than a resolution of individual depth images of the plurality of depth images.

10. The non-transitory computer-readable medium of claim 8, wherein the displacer is positioned between the texture projector and the environment and configured to cause variations in the texture pattern projected onto the environment.

11. A system comprising:
- a robotic manipulator;
- at least one projector coupled to a rail on the robotic manipulator and configured to project a texture pattern onto an environment;
- a displacer coupled to the at least one projector and configured to repeatedly change a position of the texture pattern within the environment using a MicroElectroMechanical System (MEMS) device configured to repeatedly provide a back-and-forth motion that physically alters a position of the texture projector on a predefined path along the rail while the at least one projector projects the texture pattern, wherein the MEMS device is configured to provide the back-and-forth motion at one or more frequencies based on a signal received by the MEMS device from a computing device;
- at least two optical sensors configured to capture stereo sensor data for the environment, wherein the stereo sensor data comprises a plurality of image pairs corresponding to a plurality of different positions of the texture pattern during a predetermined time period, and wherein each image pair of the plurality of image pairs comprises a first image captured from a first viewpoint of a first optical sensor and a second image captured from a second viewpoint of a second optical sensor; and
- the computing device configured to determine, using the stereo sensor data, an output including a virtual representation of the environment, wherein the output comprises a depth of at least one surface in the environment.

12. The system of claim 11, wherein the computing device is configured to determine the output including the virtual representation of the environment using the stereo sensor data by:
- determining, using the plurality of image pairs, a plurality of depth images; and
- determining an output depth image that integrates information from the plurality of depth images, wherein the output depth image has a higher resolution than a resolution of individual depth images of the plurality of depth images.

13. The system of claim 11, wherein the displacer comprises an electronically controllable optical element positioned between the at least one projector and the environment and configured to cause variations in the texture pattern projected onto the environment.

14. The system of claim 13, wherein the electronically-controllable optical element comprises an electronically-controllable lens through which the texture pattern is projected.

15. The system of claim 13, wherein the electronically-controllable optical element comprises an electronically-controllable prism through which the texture pattern is projected.

16. The system of claim 11, wherein the displacer is configured to repeatedly change the position of the texture pattern in a plurality of directions during the predetermined time period.

17. The method of claim 1, wherein causing the displacer coupled to the texture projector to repeatedly change the position of the texture pattern within the environment using the MEMS device configured to repeatedly provide the back-and-forth motion that physically alters the position of the texture projector comprises:
- causing the displacer to repeatedly change the position of the texture pattern within the environment by causing the MEMS device to randomly vibrate along an axis for a predetermined time period.

18. The method of claim 17, wherein causing the displacer to repeatedly change the position of the texture pattern within the environment by causing the MEMS device to randomly vibrate along an axis for a predetermined time period comprises:
- causing the MEMS device to randomly vibrate along a horizontal axis for the predetermined time period.

19. The method of claim 17, wherein causing the displacer to repeatedly change the position of the texture pattern within the environment by causing the MEMS device to randomly vibrate along an axis for a predetermined time period comprises:
- causing the MEMS device to randomly vibrate along a vertical axis for the predetermined time period.

* * * * *